(12) United States Patent
Leimer

(10) Patent No.: US 10,761,404 B2
(45) Date of Patent: Sep. 1, 2020

(54) PRIVACY SHUTTER FOR COMPUTER CAMERA

(71) Applicant: Handstands Promo, LLC, Alpine, UT (US)

(72) Inventor: Stefan Leimer, Salt Lake City, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 332 days.

(21) Appl. No.: 15/837,778

(22) Filed: Dec. 11, 2017

(65) Prior Publication Data
US 2019/0179212 A1 Jun. 13, 2019

(51) Int. Cl.
*G03B 11/04* (2006.01)
*G06F 1/16* (2006.01)

(52) U.S. Cl.
CPC .......... *G03B 11/043* (2013.01); *G03B 11/041* (2013.01); *G06F 1/1686* (2013.01)

(58) Field of Classification Search
CPC ... G03B 11/043; G03B 11/041; G06F 1/1686; H04N 5/232
USPC ....................................................... 359/227
See application file for complete search history.

(56) References Cited

U.S. PATENT DOCUMENTS

| | | |
|---|---|---|
| D669,112 S | 10/2012 | Gustaveson, II |
| 8,471,956 B2 | 6/2013 | Fortmann |
| D708,657 S | 7/2014 | Gustaveson |
| D721,396 S | 1/2015 | Gustaveson, II |
| D763,843 S | 8/2016 | Gustaveson, II |
| D782,562 S | 3/2017 | Gustaveson, II |
| D793,465 S | 8/2017 | Kong |
| D794,108 S | 8/2017 | Ham et al. |
| D794,645 S | 8/2017 | Erlick |
| 9,829,770 B1 | 11/2017 | Gustaveson, II |
| D807,947 S | 1/2018 | Gustaveson, II |
| D808,457 S | 1/2018 | Gustaveson, II |
| D810,180 S | 2/2018 | Gustaveson, II |
| D816,149 S | 4/2018 | Dalton |
| 10,015,296 B1 | 7/2018 | Haymond |

(Continued)

FOREIGN PATENT DOCUMENTS

| | | |
|---|---|---|
| WO | WO DM/095 351 | 9/2016 |
| WO | WO DM/095 613 | 9/2016 |

OTHER PUBLICATIONS

Targus, "Spy Guard Webcam Cover", http://www.targus.com/us/spy-guard-webcam-cover-3-pack-awh012us as accessed on this date: Dec. 14, 2017.

(Continued)

*Primary Examiner* — Euncha P Cherry
(74) *Attorney, Agent, or Firm* — Thorpe, North & Western, LLP

(57) ABSTRACT

A privacy shutter selectively covers and exposes a camera lens on a computer device. The privacy shutter has a frame with an aperture and a slider carried by the frame and slidable in the aperture. The slider slides between open and closed positions. The frame has a channel in an outer side of the frame and extending from the aperture to a perimeter of the frame. The channel has an outer opening and an inner cavity slidably receiving the slider therein. The outer opening of the channel exposes the outer surface of the slider in both the closed and opened positions.

20 Claims, 6 Drawing Sheets

(56) References Cited

U.S. PATENT DOCUMENTS

| | | |
|---|---|---|
| 10,070,021 B1 | 9/2018 | Rolle |
| D836,154 S | 12/2018 | Gustaveson, II |
| D837,279 S | 1/2019 | Penn |
| D839,946 S | 2/2019 | De Vries |
| D849,123 S | 5/2019 | Gustaveson, II |
| 10,317,776 B2 | 6/2019 | Gustaveson, II |
| 2011/0182029 A1 | 7/2011 | Wu et al. |
| 2014/0220269 A1 | 8/2014 | Ogufere Ogufere |
| 2015/0009399 A1 | 1/2015 | Jonsson et al. |
| 2015/0015777 A1 | 1/2015 | Osborne et al. |
| 2015/0070575 A1 | 3/2015 | Lee et al. |
| 2016/0088264 A1 | 3/2016 | Freeze |
| 2016/0161830 A1 | 6/2016 | Gonzalez Sanchez et al. |
| 2017/0329206 A1 | 11/2017 | Gustaveson, II |
| 2017/0371128 A1 | 12/2017 | Li et al. |
| 2018/0059510 A1* | 3/2018 | Gustaveson, II ..... G06F 1/1686 |
| 2018/0123631 A1 | 5/2018 | Hessabi |

OTHER PUBLICATIONS

Hit Promotional Products, "#265 Security Webcam Cover", https://www.hitpromo.net/product/show/265/security-webcam-cover as accessed on this date: Dec. 14, 2017.

* cited by examiner

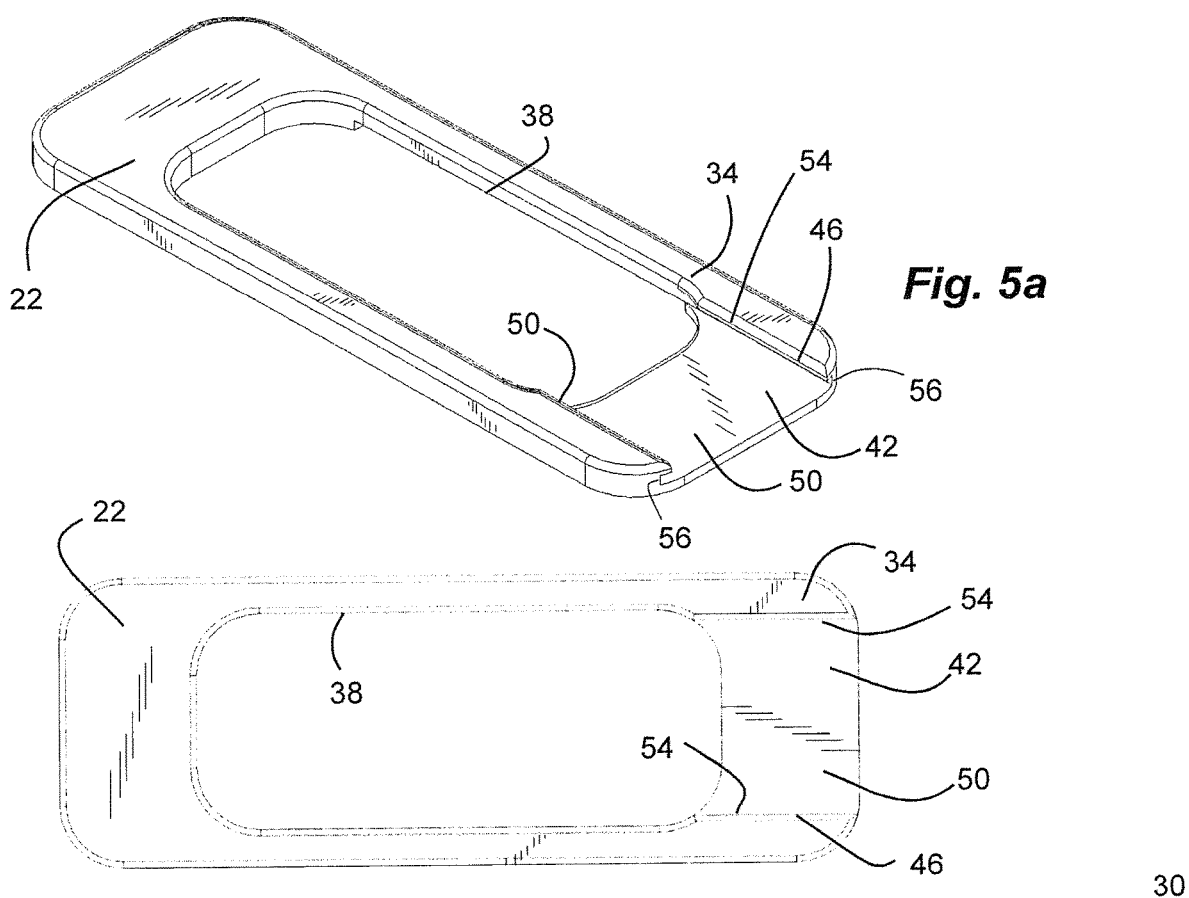
*Fig. 5a*
*Fig. 5b*
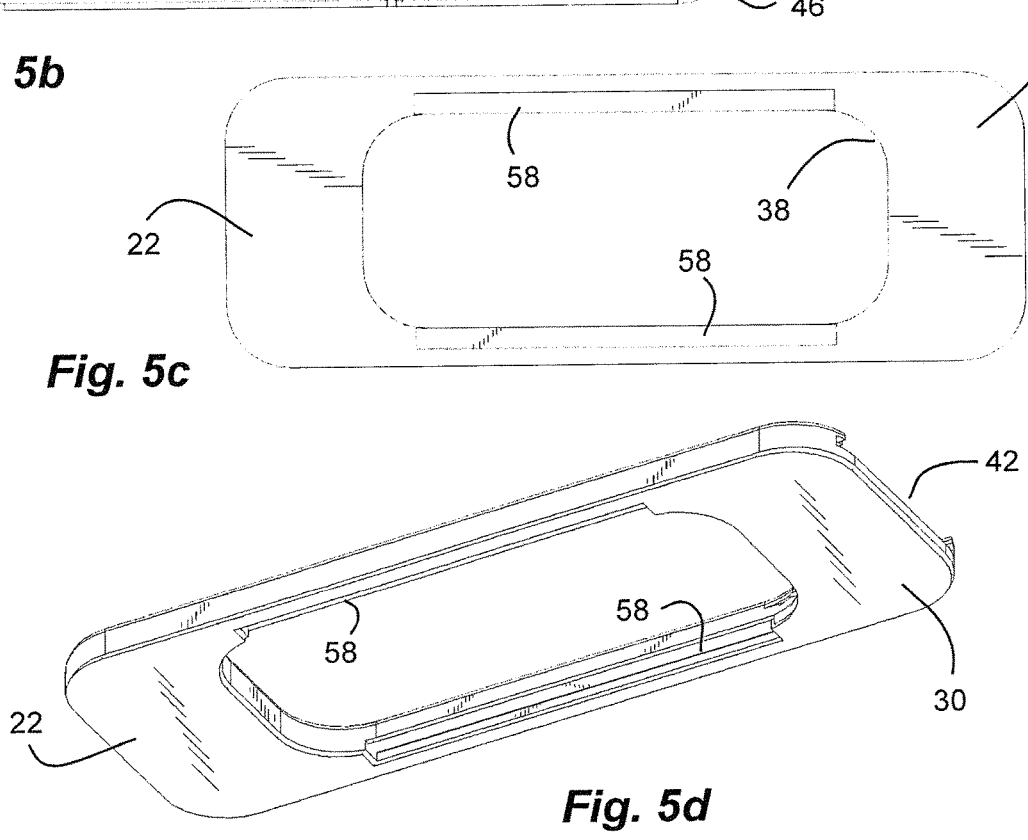
*Fig. 5c*
*Fig. 5d*

PRIVACY SHUTTER FOR COMPUTER CAMERA

BACKGROUND

Field of the Invention

The present invention relates generally to a privacy shutter to selectively cover a lens of a computer camera.

Related Art

Cameras are routinely included on computers, such as laptops, to allow for live video transmission. Privacy concerns continue to grow with respect to unintended video capture or malicious access to the camera.

SUMMARY OF THE INVENTION

It has been recognized that it would be advantageous to develop a privacy shutter to selectively cover and expose a camera lens of a camera.

The invention provides a privacy shutter to selectively cover and expose a camera lens on a computer. The shutter comprises a frame with an inner side to be affixed to a surface surrounding the camera lens on the computer device, an outer side and an aperture circumscribed by the frame. A slider is carried by the frame and slidable with respect to the aperture. The slider has an outer surface. The slider is slidable with respect to the frame between: a closed position in which the slider is disposed across the aperture of the frame and is configured to be disposed over the camera lens on the computer device; and an open position in which the slider exposes the aperture of the frame and is configured to expose the camera lens on the computer device. A channel is disposed in the outer side of the frame and extends from the aperture to a perimeter of the frame. The channel has opposite open ends with one open end in the aperture and another open end in the perimeter. The opposite open ends slidably receive the slider therethrough. The channel has an outer opening and an inner cavity slidably receiving the slider therein. The outer opening of the channel exposes the outer surface of the slider in both the closed and opened positions. The outer opening is narrower than the inner cavity and forms opposite lips extending over the slider to retain the slider in the inner cavity of the channel. The outer opening of the channel of the frame has a width between the lips less than a width of the aperture of the frame.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 5a is a perspective view of a frame of the privacy shutter of FIG. 1a;

FIG. 5b is a front view of the frame of the privacy shutter of FIG. 1a;

FIG. 5c is a rear view of the frame of the privacy shutter of FIG. 1a;

FIG. 5d is a rear perspective view of the frame of the privacy shutter of FIG. 1a;

FIG. 6a is a perspective view of a slider of the privacy shutter of FIG. 1a;

FIG. 6b is a front view of the slider of the privacy shutter of FIG. 1a;

FIG. 6c is a rear view of the slider of the privacy shutter of FIG. 1a;

FIG. 6d is a rear perspective view of the slider of the privacy shutter of FIG. 1a;

Figure 1A:
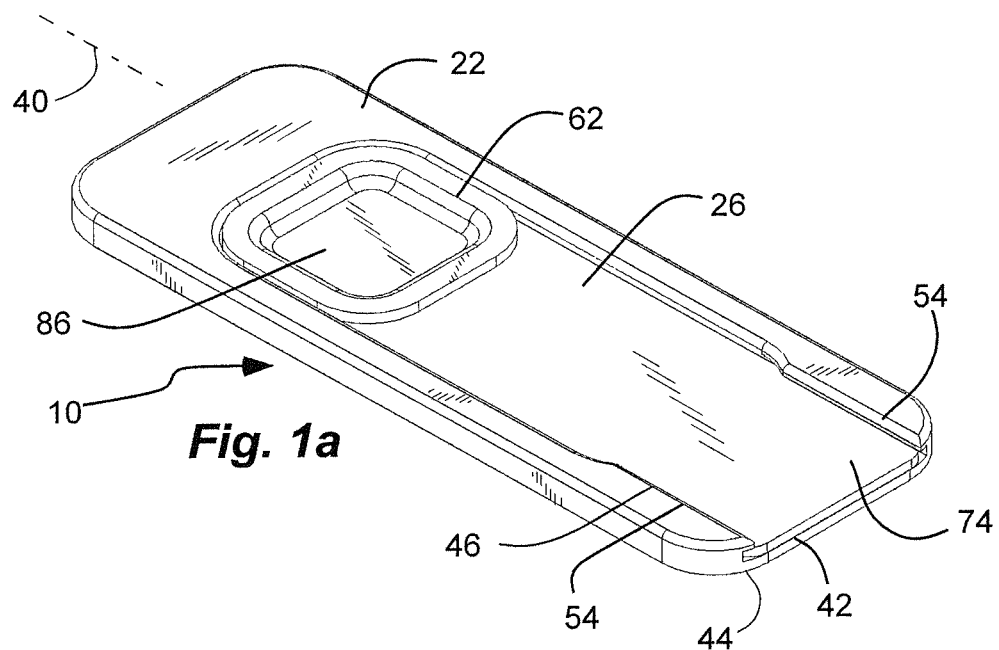
FIG. 1a is a perspective view of a privacy shutter in accordance with an embodiment of the present invention, shown in a closed or privacy position.
Figure 1B:
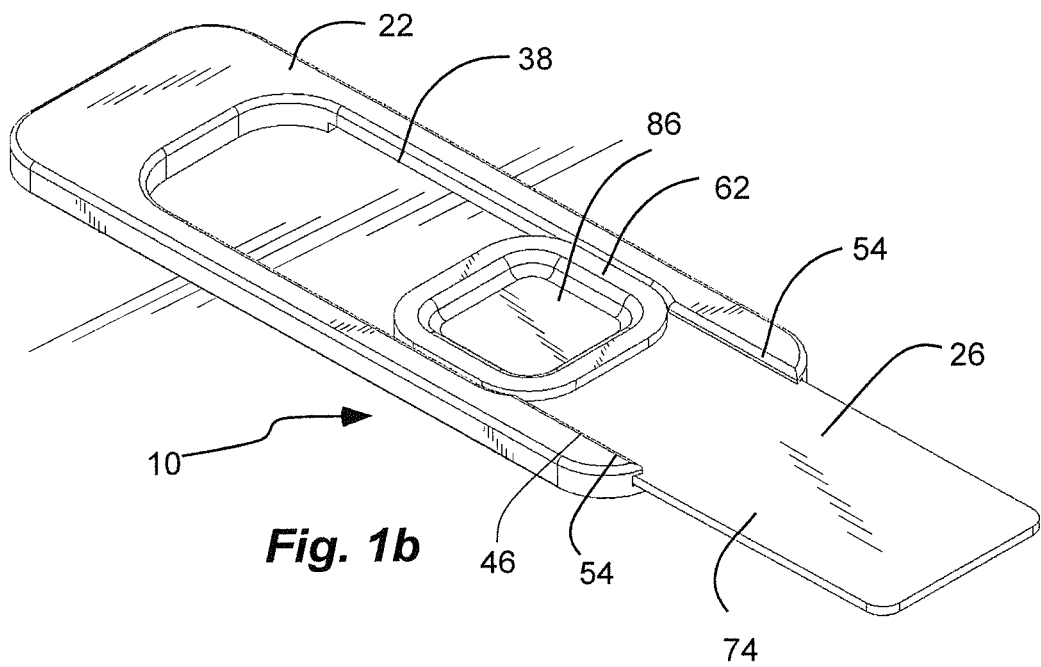
FIG. 1b is a perspective view of the privacy shutter of FIG. 1a, shown in the open or use position.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As used herein, the terms "computer" and "computer device" are used interchangeably to refer to a computer, such as a laptop computer, tablet computer, desktop computer, or cellular phone, with a camera.

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both.

A privacy shutter is presented that can be adhered to a surface of a computer surrounding a camera lens of a computer camera. The privacy shutter can selectively cover and expose the camera lens. The shutter can be thin to accommodate a thin gap between a display and a keyboard of a laptop computer when folded. In addition, the shutter can be small to accommodate the limited space surrounding the camera lens. Furthermore, the shutter can present a surface for indicium. The shutter can be configured to present the indicium at all times without covering or obscuring the indicium.

As illustrated in FIGS. 1a-7b, a privacy shutter, indicated generally at 10, in an example implementation in accordance with the invention is shown for selectively covering and exposing a camera lens 14 on a computer device 18. The privacy shutter 10 has a frame 22 and a slider 26 carried by the frame. The frame 22 has an inner side 30 disposed against, and at least a portion of affixed to, a surface surrounding the camera lens 14 on the computer device 18. In addition, the frame 22 has an outer side 34 opposite the inner side 30. An aperture 38 is disposed in the frame and circumscribed by the frame 22. The aperture 38 can be aligned with and can circumscribe the camera lens 14. The frame 22 can be thin. In one aspect, the frame 22 and the shutter 10 can have a thickness between the inner and outer sides less than 0.1 inches (2.5 mm) in one aspect, less than 0.08 inches (2 mm) in another aspect, and approximately 0.06 inches (1.5 mm) in another aspect. The frame 22 and the shutter 10 can be elongated, and can have a length along a longitudinal axis 40 longer than a width thereof.

A channel 42 is disposed in the outer side 34 of the frame 22 and extends from the aperture 38 to a perimeter 44 of the frame. Thus, the channel 42 has opposite open ends with one open end in the aperture 38 and another open end in the perimeter 44. The channel 42 can be formed in a perimeter side of the frame 22, at one end of the frame with respect to the longitudinal axis 40. The channel 42 can be aligned with a long axis or longitudinal axis 40 of the frame 22. The channel 42 has an outer opening 46 in the outer side 34 or the frame 22, and an inner cavity 50 in the frame 22. The outer opening 46 faces outwardly along with the outer side 34. The outer opening 46 is narrower than the inner cavity 50, forming opposite lips 54 extending over the inner cavity 50 of the channel 42. Thus, the outer opening 46 has a width between the lips 54, and orthogonal to the longitudinal axis 40. In one aspect, the width of the outer opening 46 can be less than a width of the aperture 38 of the frame 22, with the width of the aperture 38 parallel with the width of the outer opening 46, and orthogonal to the longitudinal axis 40. The lips 54 of the channel 42 can form opposing grooves 56 (FIGS. 4c and 5a) that face one another across the channel 42. In one aspect, the grooves 56 extend along a length of the channel 42 parallel with the longitudinal axis 40 and between the aperture 38 and the perimeter side, but not along the aperture 38 itself.

In addition, a pair of slots 58 are formed in the inner side 30 of the frame 22 on opposite sides of the aperture 38, forming a track. The slots 58 are open to the aperture 38 and extend along opposite sides thereof along a length of the slot 38 parallel with the longitudinal axis 40. The slots 58 can have a cross-sectional profile, perpendicular to the longitudinal axis 40, with one side and a bottom formed by the frame 22, and the other side formed by the surface of the computer device 18. The slots 58 can oppose one another and can have openings that face one another across the aperture 38.

Figure 4A:
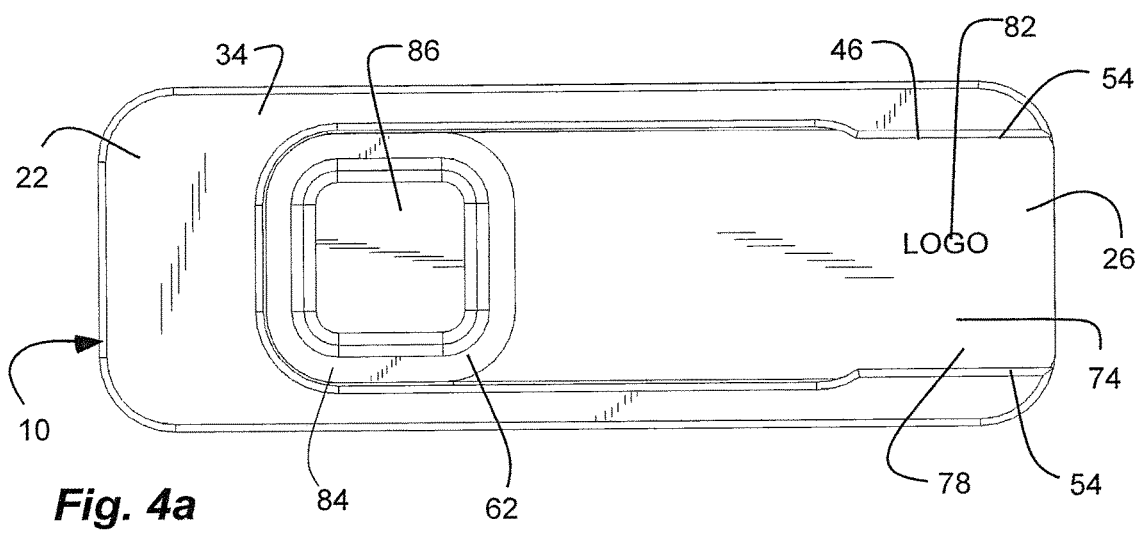
FIG. 4a is a front view of the privacy shutter of FIG. 1a, shown in the closed or privacy position.
Figure 4B:
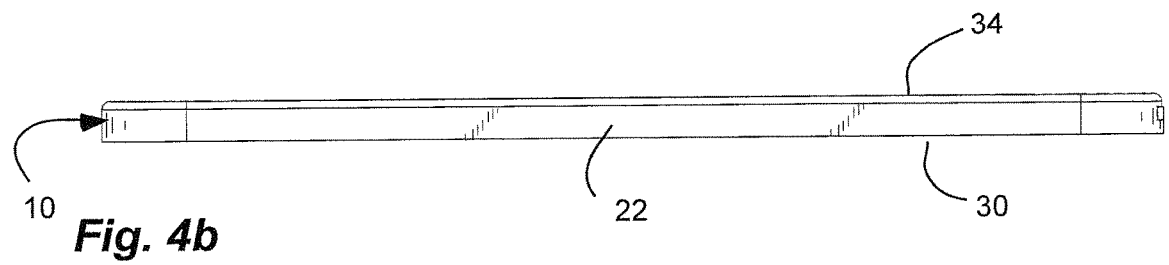
FIG. 4b is a side view of the privacy shutter of FIG. 1a, shown in the closed or privacy position.
Figure 4C:
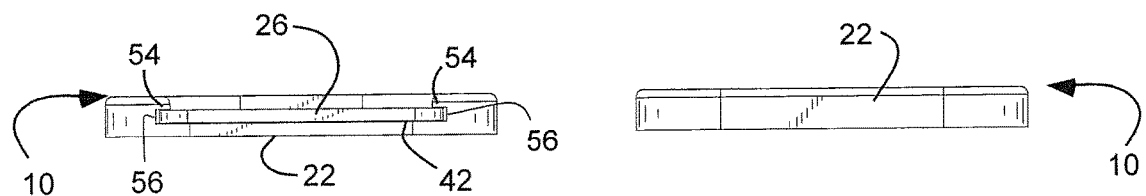
FIG. 4c is an end view of the privacy shutter of FIG. 1a, shown in the closed or privacy position.
Figure 4D:
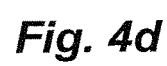
FIG. 4d is an opposite end view of the privacy shutter of FIG. 1a, shown in the closed or privacy position.
Figure 4E:
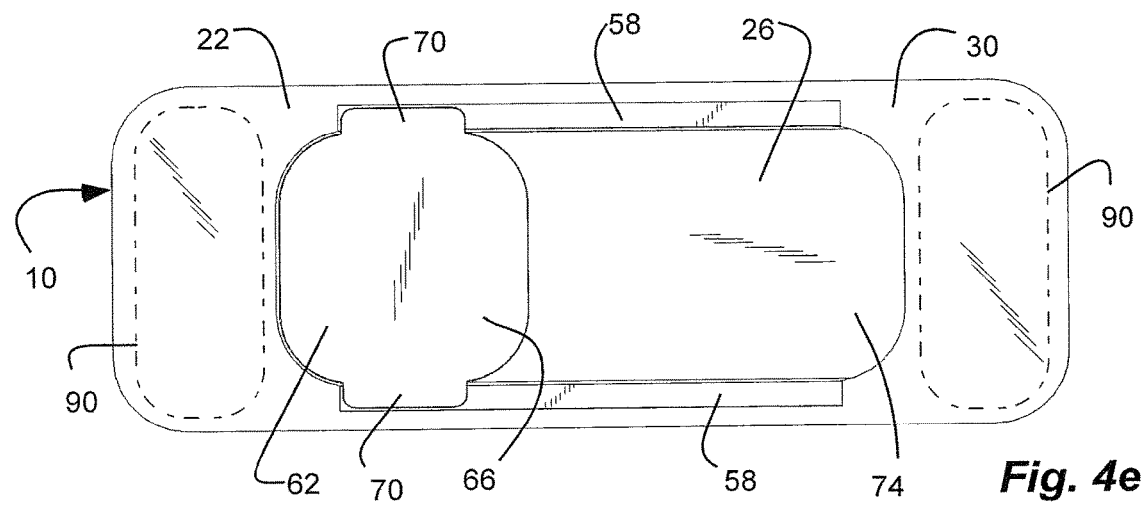
FIG. 4e is a rear view of the privacy shutter of FIG. 1a, shown in the closed or privacy position.
Figure 6A:
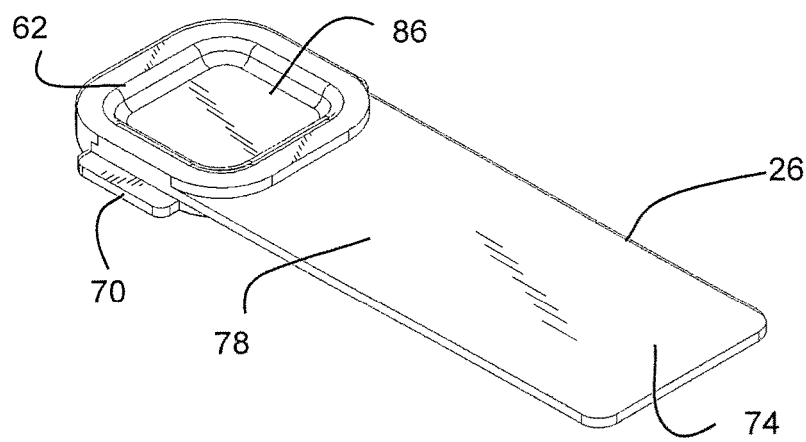
Figure 6B:
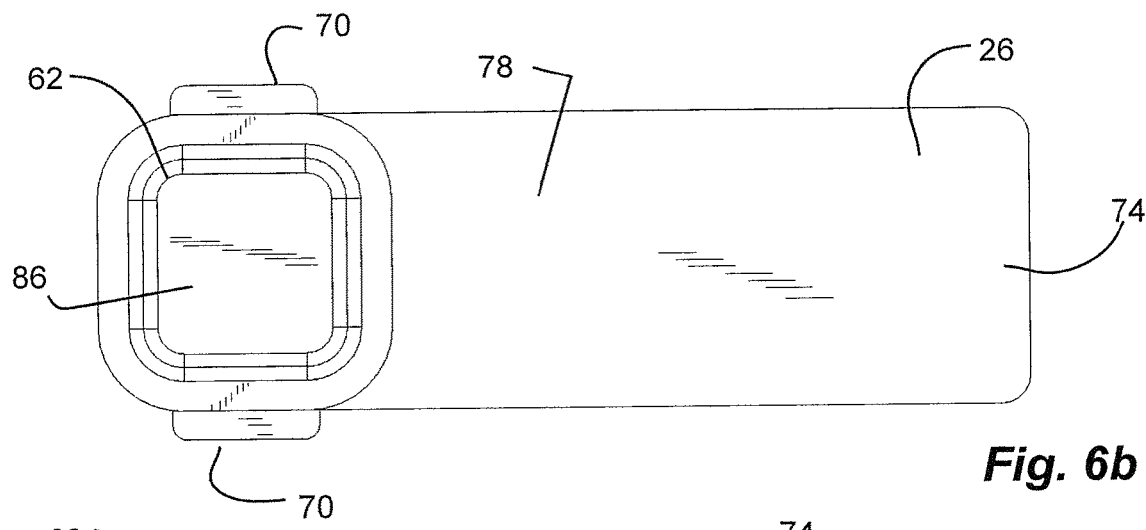
Figure 6C:
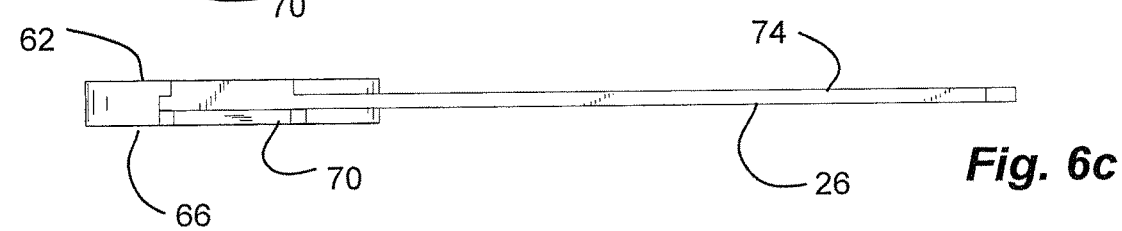
Figure 6D:
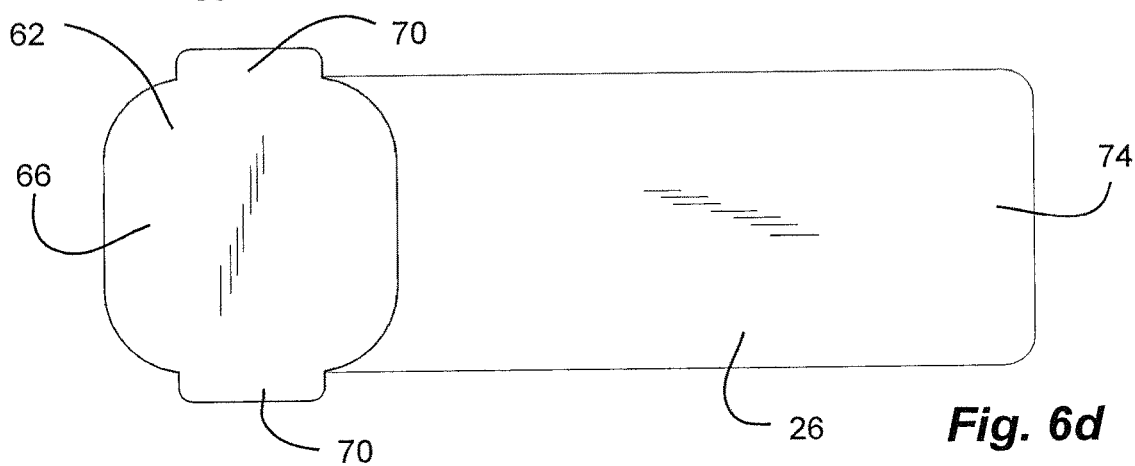
Figure 7A:
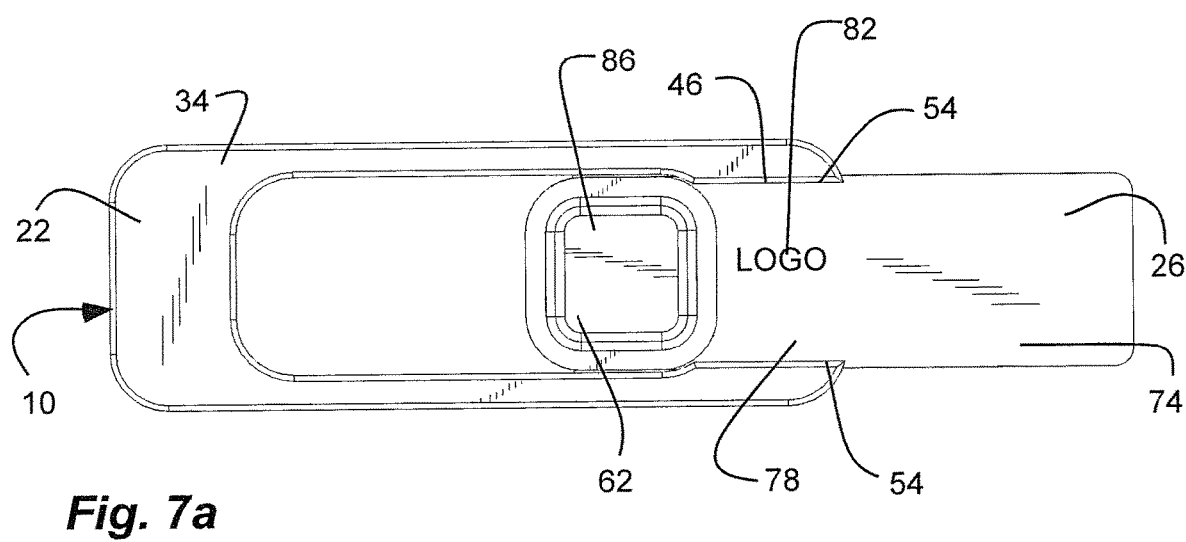
FIG. 7a is a front view of the privacy shutter of FIG. 1a, shown in the closed or privacy position.
Figure 7B:
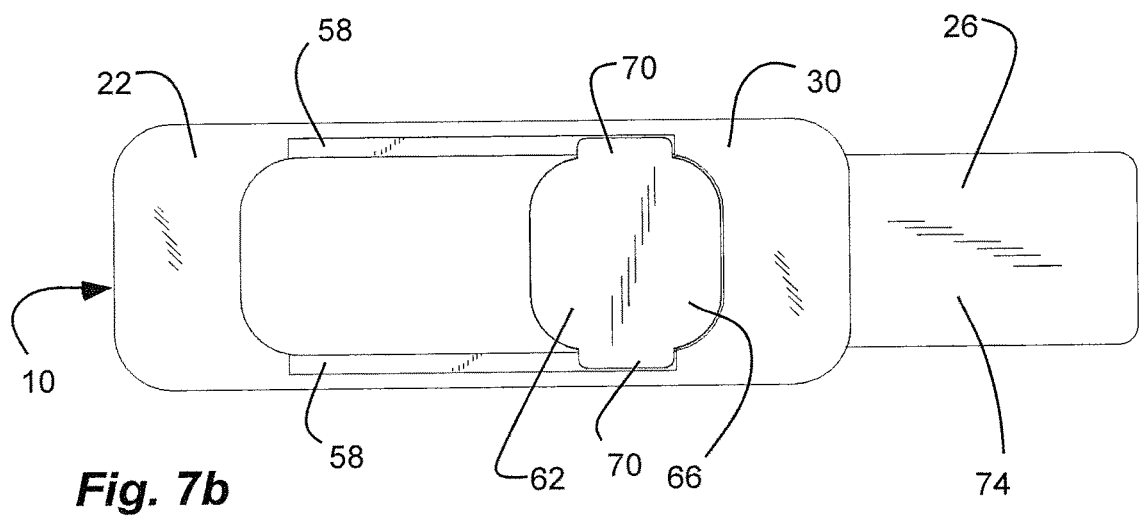
FIG. 7b is a rear view of the privacy shutter of FIG. 1a, shown in the open or use position.

The slider 26 is carried by the frame 22 and slidably with respect to the aperture 38 and the frame 22. The slider 26 has a head 62 slidably disposed in the aperture 38 of the frame 22. The head 62 remains in the aperture 38 as it slides therein, and as the slider 26 slides. The head 62 or the slider 26 has an inner surface 66 that can be flush with the inner side 30 of the frame 22, and that can abut to and slide against the surface of the computer device 18. A pair of tabs 70 extend from opposite sides of the head 62 and into the pair of slots 58, respectively, as shown in FIG. 4e. The pair of tabs 70 is slidable in the pair of slots 58 as the slider 26 slides. The pair of tabs 70 are held between the frame 22 and the computer device 18. The pair of tabs 70 retain the head 62 in the aperture 38, and resist the head 62 from coming out of the aperture 38.

In addition, the slider 26 has a flap 74 that extends from the head 62 and into the channel 42 of the frame 22. The flap 74 is slidable in the channel 42 and between the lips 54 and in the grooves 56, with the lips 54 and the grooves 56 retaining the flap 74 in the channel 42. The flap 74 and the slider 26 have an outer surface 78 that is exposed in the outer opening 46 of the channel 42, and between the lips 54 of the channel. The flap 74, or at least a portion thereof, remains in the channel 42, and over a portion of the frame 22, while a portion of the slider 26 or the flap 74 can extend out of the aperture 38 and beyond the perimeter 44 of the frame 22. Thus, a portion of the slider 26 or the flap 74 remains over the frame 22 at the channel 42. The slider 26 is held at two separate and distinct points, namely the head 62 being held in the aperture 38 with the tabs 70 thereof held in the slots 58, and the flap 74 held in the channel 42 and in the grooves 56 thereof. Thus, the slider 26 can be held firmly and sliding motion of the slider can be smooth and binding resisted due to the two points of retention. In addition, the slider 26 is held from opposite sides of the frame 22 with the tabs 70 in the slots 58 on the back side and the flap 74 I the grooves 56 on the front side. In one aspect, the flap 74 of the slider 26 is held only by the lips 54 and in the grooves 56, and not in the aperture 38, to facilitate assembly of the slider 26 with the frame 22. For example, the flap 74 of the slider 26 can be inserted into the aperture 38 from the back and into the grooves 56, and the head 62 inserted into the aperture 38 with the tabs 70 in the slots 58, because the width of the channel 42 between the lips 54 are narrower than the width of the aperture 38, and because the grooves 56 only extend along the channel 42, and not into the aperture 38.

Figure 2A:
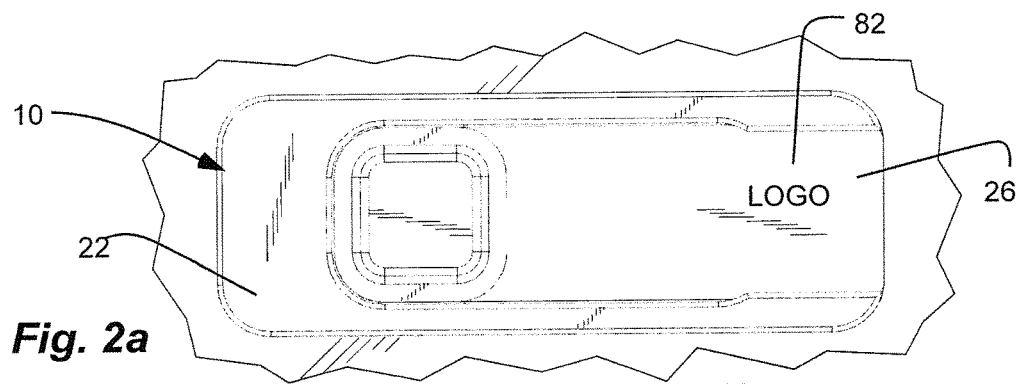
FIG. 2a is a front view of the privacy shutter of FIG. 1a, shown in the closed or privacy position on a computer.
Figure 2B:
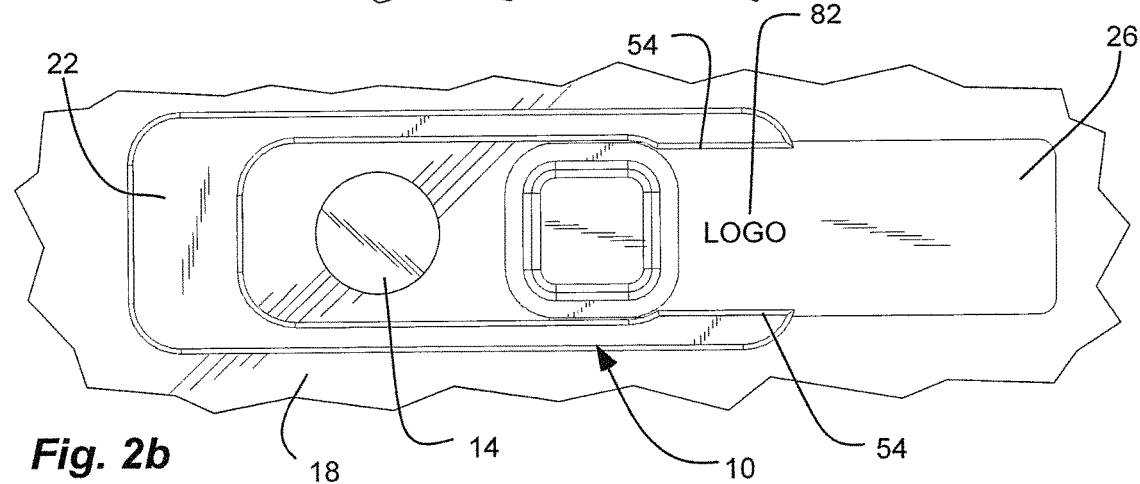
FIG. 2b is a front view of the privacy shutter of FIG. 1a, shown in the open or use position.
Figure 3:
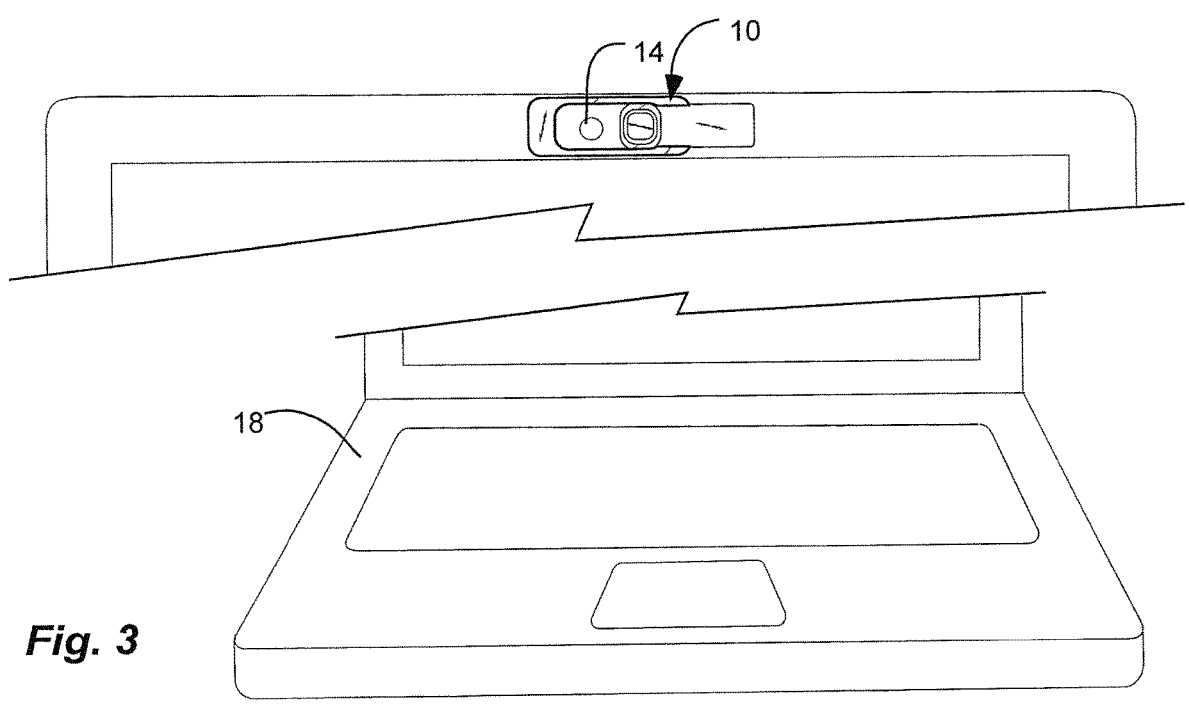
FIG. 3 is a schematic view of the privacy shutter of FIG. 1a, shown in the open or use position on a computer.

The slider 26 is slidable with respect to the frame 22 and the aperture 38 between open and closed positions. In the closed position, the slider 22 is disposed across the aperture 38 of the frame 22, to be disposed over the camera lens 14 of the computer device 18, as shown in FIG. 2a. In one aspect, the slider 22 can be disposed across the entire aperture 38, and can span the aperture 38, as shown. In another aspect, the slider 22 can be disposed across a portion of the aperture 38 of the frame 22 corresponding to the camera lens 14 of the computer device 18. The head 62 is disposed in the aperture 38 of the frame 22 in the closed position. Similarly, the flap 74, or a portion thereof, is disposed in the aperture 38 of the frame 22 in the closed position, while the remaining portion of the flap 74 is disposed in the channel 42. The slider can be characterized as being disposed in the aperture in the closed position. In one aspect, the entire slider 26, including the head 62 and the flap 74, can be contained within a perimeter of the frame 22 in the closed position, thus reducing the risk of a portion of the slider becoming snagged during use. The head 62 remains in the aperture 38 in both the open and the closed positions. A distal end of the flap 74, opposite the head 62, is disposed in the channel 46 and over a portion of the frame 22 in the closed position. In the open position, the slider 22 and the flap 74 and the head 62 expose the aperture 38 of the frame 22, to expose the camera lens 14 of the computer device 18, as shown in FIG. 2b. A portion of the slider 26 or the flap 74 extends beyond the perimeter 44 of the frame 22 in the open position. The outer opening 46 of the channel 42 between the lips 54 exposes the outer surface 78 of the slider 26 and the flap 74 in the opened position, as well as the closed position. Thus, indicium 82, such as a logo, can be disposed on the outer surface 78 of the slider 26 and the flap 74. The indicium 82 is exposed in both the open and the closed positions of the slider 26. In one aspect, the indicium 82 can be disposed between the lips 54, and over the channel 42 of the frame 22 in the open position of the slider 26 and the flap 74, as shown in FIG. 2b. The indicium 82 can be indicative of or represent a business, a product, or both. Thus, the shutter 10 can be used as a promotional product.

In one aspect, the head 62 can be a raised head and can extend from the outer surface 78 of the slider 26 and the flap 74. The head 62 can have an outer surface 84 (FIG. 4a) substantially flush with the outer side 34 of the frame 22. Thus, the head 62 can have a thickness substantially the same as the thickness of the frame 22. An indentation 86 can be formed in the head 62 or outer surface 84 thereof to form a finger recess to facilitate engaging the slider 26 and sliding the slider back and forth. Because the inner surface 66 of the head 62 can abut to the surface of the computer device 18, force applied to the head 62 or the indentation 86 can bear against the computer device 18 and not the frame 22. In addition, the head 62 and the finger recess or indentation 86 is contained within a perimeter of the frame 22. Thus, force applied outside of the frame can be reduced to reduce the risk of inadvertently dislodging the shutter from the computer device. A perimeter of the head 62 can circumscribe the indentation 86. The head 62 is disposed in the aperture 38 of the frame 22, and slidable therein. The head 62 has a width orthogonal to the longitudinal axis 40 that spans the width of the aperture 38 of the frame 22. The width of the outer opening 46 of the channel 42 of the frame 22 is less than the width of the aperture 38 of the frame 22, and the head 62. The head 62 abuts to the pair of lips 54 and the open end of the channel 46 in the aperture 38 in the open position to retain the slider 26 in the frame 22.

In another aspect, an adhesive 90 is disposed on the inner side 30 of the frame 22 to adhere the frame 22 to the surface surrounding the camera lens 14 on the computer device 18. The adhesive 90 is disposed on opposite sides of the aperture 39. In addition, the adhesive 90 is disposed on the inner side 30 of the frame 22 opposite the channel 42. Thus, the frame 22 and the shutter 10 can be securely adhered to the computer.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A privacy shutter configured to selectively cover and expose a camera lens of a computer device, the privacy shutter comprising:
  a) a frame with an inner side configured to be affixed to a surface surrounding the camera lens on the computer device, an outer side opposite the inner side, and an aperture circumscribed by the frame;
  b) a slider carried by the frame and slidable with respect to the aperture, the slider having an outer surface, the slider being slidable with respect to the frame between:
    i) a closed position in which the slider is disposed across the aperture of the frame and is configured to be disposed over the camera lens of the computer device; and
    ii) an open position in which the slider exposes the aperture of the frame and is configured to expose the camera lens of the computer device;
  c) a channel in the outer side of the frame and extending from the aperture to a perimeter of the frame, the channel having opposite open ends with one open end in the aperture and another open end in the perimeter, the opposite open ends slidably receiving the slider therethrough;
  d) the channel having an outer opening and an inner cavity slidably receiving the slider therein, the outer opening of the channel exposing the outer surface of the slider in both the closed and opened positions, the outer opening being narrower than the inner cavity and forming opposite lips extending over the slider to retain the slider in the inner cavity of the channel; and
  e) the outer opening of the channel of the frame having a width between the lips less than a width of the aperture of the frame.

2. The privacy shutter in accordance with claim 1, further comprising:
  a) a pair of slots in the inner side of the frame on opposite sides of the aperture; and
  b) a pair of tabs extending from opposite sides of the slider and extending into the pair of slots, respectively, the pair of tabs slidable in the pair of slots as the slider slides.

3. The privacy shutter in accordance with claim 1, further comprising:
  a raised head extending from the outer surface of the slider and being disposed in the aperture of the frame, the raised head being raised with respect to the outer surface of the slider.

4. The privacy shutter in accordance with claim 3, wherein the head has an outer surface substantially flush with the outer side of the frame.

5. The privacy shutter in accordance with claim 3, wherein the head has an outer surface with an indentation forming a finger recess; and wherein the finger recess is contained within the perimeter of the frame.

6. The privacy shutter in accordance with claim 3, wherein the head has a width spanning a width of the aperture of the frame.

7. The privacy shutter in accordance with claim 3, wherein the head has an inner surface that is flush with the inner side of the frame.

8. The privacy shutter in accordance with claim 1, further comprising:
  an adhesive disposed on the inner side of the frame configured to adhere the frame to the surface surrounding the camera lens on the computer device; and
  the adhesive being disposed on opposite sides of the aperture, including being disposed on the inner side of the frame opposite the channel.

9. The privacy shutter in accordance with claim 1, further comprising:
  indicium disposed on the outer surface of the slider; and
  the indicium being exposed in both the open and the closed positions of the slider.

10. The privacy shutter in accordance with claim 1, further comprising:
  indicium disposed on the outer surface of the slider; and
  the indicium being disposed between the lips and over the channel of the frame in the open position of the slider.

11. A privacy shutter configured to selectively cover and expose a camera lens of a computer device, the privacy shutter comprising:
  a) a frame with:
    i) an inner side configured to be affixed to a surface surrounding the camera lens on the computer device;
    ii) an outer side opposite the inner side;
    iii) an aperture circumscribed by the frame;

iv) a channel in the outer side of the frame and extending from the aperture to a perimeter of the frame, the channel having opposite open ends with one open end in the aperture and another open end in the perimeter; and v) the channel having an outer opening and an inner cavity, the outer opening being narrower than the inner cavity and forming opposite lips extending over the inner cavity of the channel; and b) a slider carried by the frame and having:

i) a head slidably disposed in the aperture of the frame with an inner surface flush with an inner side of the frame; and ii) a flap extending from the head and into the channel of the frame, the flap being slidable in the channel, the flap having an outer surface exposed in the outer opening of the channel and between the lips of the channel with the lips of the channel retaining the flap in the channel.

12. The privacy shutter in accordance with claim 11, wherein the slider is slidable with respect to the frame between:

a) a closed position in which the slider is disposed across the aperture of the frame and is configured to be disposed over the camera lens of the computer device; and b) an open position in which the slider exposes the aperture of the frame and is configured to expose the camera lens of the computer device, and in which the head of the slider remains in the aperture of the frame.

13. The privacy shutter in accordance with claim 11, further comprising:

a) a pair of slots in the inner side of the frame on opposite sides of the aperture forming a track; and ii) a pair of tabs extending from opposite sides of the head and into the pair of slots, respectively, the pair of tabs slidable in the pair of slots as the slider slides, the pair of tabs retaining the head in the aperture.

14. The privacy shutter in accordance with claim 11, wherein:

the head is raised with respect to the flap; and the head has an outer surface substantially flush with the outer side of the frame.

15. The privacy shutter in accordance with claim 11, wherein the head has an indentation forming a finger recess; and wherein the finger recess is contained within the perimeter of the frame.

16. The privacy shutter in accordance with claim 11, wherein the head has a width spanning a width of the aperture of the frame.

17. The privacy shutter in accordance with claim 11, wherein the width of the outer opening of the channel of the frame is less than a width of the aperture of the frame.

18. The privacy shutter in accordance with claim 11, further comprising:

an adhesive disposed on the inner side of the frame configured to adhere the frame to the surface surrounding the camera lens on the computer device; and the adhesive being disposed on opposite sides of the aperture, including being disposed on the inner side of the frame opposite the channel.

19. The privacy shutter in accordance with claim 11, further comprising:

indicium disposed on the outer surface of the slider; and the indicium being disposed between the lips and over the channel of the frame in the open position of the slider.

20. A privacy shutter configured to selectively cover and expose a camera lens of a computer device, the privacy shutter comprising:

a) a frame with:

i) an inner side configured to be affixed to a surface surrounding the camera lens on the computer device;

ii) an outer side opposite the inner side;

iii) an aperture circumscribed by the frame;

iv) a channel in the outer side of the frame and extending from the aperture to a perimeter of the frame, the channel having opposite open ends with one open end in the aperture and another open end in the perimeter;

v) the channel having an outer opening and an inner cavity, the outer opening being narrower than the inner cavity and forming opposite lips extending over the inner cavity of the channel; and vi) a pair of slots in the inner side of the frame on opposite sides of the aperture forming a track; and b) a slider carried by the frame and having:

i) a head slidably disposed in the aperture of the frame with an inner surface flush with an inner side of the frame;

ii) a pair of tabs extending from opposite sides of the head and into the pair of slots, respectively, the pair of tabs slidable in the pair of slots as the slider slides, the pair of tabs retaining the head in the aperture; and iii) a flap extending from the head and into the channel of the frame, the flap being slidable in the channel, the flap having an outer surface exposed in the outer opening of the channel and between the lips of the channel with the lips of the channel retaining the flap in the channel; and c) the slider slidable with respect to the frame between:

i) a closed position in which the slider is disposed across the aperture of the frame configured to be disposed over the camera lens of the computer device; and ii) an open position in which the slider exposes the aperture of the frame and configured to expose the camera lens of the computer device, the outer opening of the channel exposing the outer surface of the slider in the opened position.

\* \* \* \* \*